US009098157B2

(12) United States Patent
Jeong et al.

(10) Patent No.: US 9,098,157 B2
(45) Date of Patent: Aug. 4, 2015

(54) TOUCH SENSING APPARATUS

(71) Applicant: Samsung Electro-Mechanics Co., Ltd., Suwon (KR)

(72) Inventors: Moon Suk Jeong, Suwon (KR); Byeong Hak Jo, Suwon (KR); Yong Il Kwon, Suwon (KR); Tah Joon Park, Suwon (KR)

(73) Assignee: SAMSUNG ELECTRO-MECHANICS CO., LTD., Suwon (KR)

( * ) Notice: Subject to any disclaimer, the term of this patent is extended or adjusted under 35 U.S.C. 154(b) by 163 days.

(21) Appl. No.: 13/800,463

(22) Filed: Mar. 13, 2013

(65) Prior Publication Data
US 2014/0184557 A1   Jul. 3, 2014

(30) Foreign Application Priority Data

Dec. 28, 2012   (KR) ........................ 10-2012-0157031

(51) Int. Cl.
*G06F 3/044* (2006.01)
*G06F 3/041* (2006.01)

(52) U.S. Cl.
CPC .............. *G06F 3/044* (2013.01); *G06F 3/0418* (2013.01)

(58) Field of Classification Search
None
See application file for complete search history.

(56) References Cited

U.S. PATENT DOCUMENTS

| | | | | |
|---|---|---|---|---|
| 4,698,461 A * | 10/1987 | Meadows et al. | ............. | 345/174 |
| 7,414,607 B2 * | 8/2008 | Washio et al. | ................ | 345/100 |
| 7,567,240 B2 * | 7/2009 | Peterson et al. | ............... | 345/173 |
| 8,248,084 B2 * | 8/2012 | Bokma et al. | .................. | 324/658 |
| 8,730,197 B2 * | 5/2014 | Hamaguchi et al. | .......... | 345/173 |
| 2002/0039092 A1 * | 4/2002 | Shigetaka | ...................... | 345/156 |
| 2002/0186210 A1 * | 12/2002 | Itoh | ................. | 345/173 |
| 2004/0119675 A1 * | 6/2004 | Washio et al. | ................... | 345/87 |
| 2008/0024455 A1 * | 1/2008 | Lee et al. | ....................... | 345/173 |
| 2010/0073301 A1 * | 3/2010 | Yousefpor et al. | ............. | 345/173 |
| 2011/0109585 A1 * | 5/2011 | Kwon et al. | ..................... | 345/174 |
| 2011/0210938 A1 * | 9/2011 | Kuang et al. | .................... | 345/174 |
| 2011/0210942 A1 * | 9/2011 | Kitamori et al. | ............... | 345/174 |
| 2011/0231139 A1 * | 9/2011 | Yokota et al. | .................. | 702/104 |
| 2011/0242050 A1 * | 10/2011 | Byun et al. | ...................... | 345/174 |
| 2011/0267309 A1 * | 11/2011 | Hanauer et al. | ................ | 345/174 |
| 2012/0092312 A1 * | 4/2012 | Xue et al. | ....................... | 345/205 |
| 2014/0176485 A1 * | 6/2014 | Holmberg et al. | ............. | 345/174 |
| 2014/0184557 A1 * | 7/2014 | Jeong et al. | ..................... | 345/174 |

FOREIGN PATENT DOCUMENTS

| KR | 10-2011-0052423 | 5/2011 |
|---|---|---|
| KR | 10-2011-0131023 | 12/2011 |

* cited by examiner

*Primary Examiner* — Peter Vincent Agustin

(57) ABSTRACT

There is provided a touch sensing apparatus including: a panel unit including a plurality of driving electrodes and a plurality of sensing electrodes; a driving circuit unit applying one of a driving signal and a scanning signal having a frequency different from that of the driving signal, to each of the plurality of driving electrodes; a sensing circuit unit measuring a change in capacitance of a plurality of node capacitors generated in intersections of the plurality of driving electrodes and the plurality of sensing electrodes; and a calculation unit determining a touch based on a change in the capacitance, wherein when the scanning signal is applied to the plurality of driving electrodes, the calculation unit calculates capacitance deviations in the plurality of node capacitors from the deviations of changes in the capacitance generated by the plurality of node capacitors.

14 Claims, 6 Drawing Sheets

TOUCH SENSING APPARATUS

CROSS-REFERENCE TO RELATED APPLICATIONS

This application claims the priority of Korean Patent Application No. 10-2012-0157031 filed on Dec. 28, 2012, in the Korean Intellectual Property Office, the disclosure of which is incorporated herein by reference.

BACKGROUND OF THE INVENTION

1. Field of the Invention

The present invention relates to a touch sensing apparatus for maintaining changes in capacitance generated by node capacitors formed in a touch panel uniformly by compensating for capacitance deviations in the node capacitors.

2. Description of the Related Art

A touch sensing apparatus such as a touchscreen, a touch pad, or the like, is an input device attached to a display device to provide an intuitive data input method to a user. Recently, a touch sensing apparatus has been widely applied to various electronic devices such as cellular phones, personal digital assistants (PDAs), navigation devices, and the like. In particular, recently, as demand for smartphones has increased, an employment rate of touchscreens as touch sensing apparatuses capable of providing various input methods in a limited area is on the rise.

Touchscreens employed in portable devices may be classified as resistive-type touchscreens and capacitive-type touchscreens according to a method of sensing a touch utilized thereby. Among these, capacitive touchscreens, having advantages in terms of relatively long lifespans and various easily implementable data input methods, has been increasingly applied. In particular, the capacitive touchscreen, facilitating implementation of a multi-touch interface relative to the resistive touchscreen, is extensively employed in devices such as smartphones, and the like.

The capacitive touchscreen includes a plurality of electrodes having a predetermined pattern, and a plurality of nodes in which capacitance is changed by a touch are defined by the plurality of electrodes. The plurality of nodes distributed on a two-dimensional (2D) plane generate changes in self-capacitance or in mutual-capacitance according to a touch applied thereto, and coordinates of a touch may be calculated by applying a weighted average calculation method, or the like, to the change in capacitance generated in the plurality of nodes. In order to calculate accurate coordinates of a touch, a technique for accurately sensing a change in capacitance generated by a touch is required. However, when capacitance of node capacitors is changed due to a processing error, or the like, generated in manufacturing a touch panel, accurate sensing of a change in capacitance may be degraded.

Patent document 1, the related art document below, relates to a technique of compensating for deviations of sensing capacitance generated during fabrication of a touch panel, but without disclosing scanning a touch panel using a frequency lower than that of a driving signal to measure sensing capacitance.

RELATED ART DOCUMENT (Patent document 1) Korean Patent Laid Open Publication No. 10-2011-0052423

SUMMARY OF THE INVENTION

An aspect of the present invention provides a touch sensing apparatus in which in a state in which a touch panel is not being touched, capacitance deviations in node capacitors formed in the touch panel are calculated by applying a scanning signal having a frequency lower than that of a driving signal, and the calculated capacitance deviations are compensated for to allow changes in capacitance of the respective node capacitors are maintained uniformly.

According to an aspect of the present invention, there is provided a touch sensing apparatus including: a panel unit including a plurality of driving electrodes and a plurality of sensing electrodes; a driving circuit unit applying one of a driving signal and a scanning signal having a frequency different from that of the driving signal, to each of the plurality of driving electrodes; a sensing circuit unit measuring a change in capacitance of a plurality of node capacitors generated in intersections of the plurality of driving electrodes and the plurality of sensing electrodes; and a calculation unit determining a touch based on a change in the capacitance, wherein when the scanning signal is applied to the plurality of driving electrodes, the calculation unit calculates capacitance deviations in the plurality of node capacitors from the deviations of changes in the capacitance generated by the plurality of node capacitors.

The scanning signal may have a frequency lower than that of the driving signal.

The scanning signal is applied in a state in which the panel unit is not touched.

When the driving signal is applied to the plurality of driving electrodes, the calculation unit may generate compensation data for compensating for capacitance deviations in the plurality of node capacitors such that changes in capacitance generated by the plurality of node capacitors are uniform.

The calculation unit may control a gain of the sensing circuit unit according to the compensation data.

The sensing circuit unit may include at least one capacitor for measuring a change in capacitance, and the calculation unit may adjust capacitance of the at least one capacitor according to the compensation data.

The calculation unit may determine at least one of the amount of touch inputs, coordinates of touch inputs, and a touch gesture based on the change in the capacitance.

According to an aspect of the present invention, there is provided a touch sensing apparatus including: a panel unit including a plurality of first electrodes extending in a first axial direction and a plurality of second electrodes extending in a second axial direction crossing the first axial direction; and a controller determining a touch by detecting a change in capacitance of a plurality of node capacitors formed between the plurality of first electrodes and the plurality of second electrodes; wherein when a scanning signal having a predetermined frequency is applied to the plurality of first electrodes, the controller may calculate capacitance deviations in the plurality of node capacitors from deviations of the changes in capacitance of the plurality of node capacitors.

The scanning signal may be applied in a state in which the panel unit is not touched.

When a driving signal having a frequency higher than that of the scanning signal is applied to the first electrodes, the controller may generate compensation data for compensating for capacitance deviations in the plurality of capacitors such that changes in capacitance generated by the plurality of node capacitors are uniform.

The controller may adjust capacitance of at least one capacitor provided to detect a change in capacitance according to the compensation data.

The calculation unit may determine at least one of the amount of touch inputs, coordinates of touch inputs, and a touch gesture by detecting a change in capacitance.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
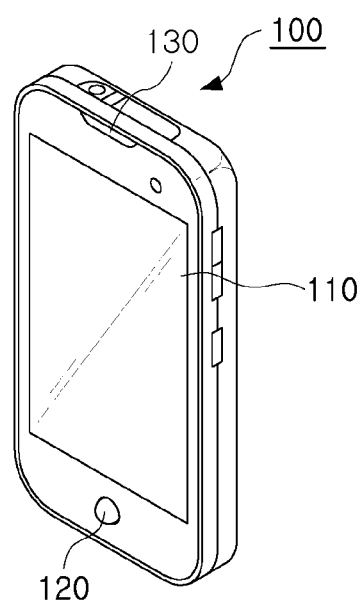
FIG. 1 is a perspective view illustrating the exterior of an electronic device including a touch sensing apparatus according to an embodiment of the present invention.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like components.

FIG. 1 is a perspective view illustrating the exterior of an electronic device including a touch sensing apparatus according to an embodiment of the present invention.

Referring to FIG. 1, an electronic device 100 according to the present embodiment may include a display unit 110 for outputting a screen, an input unit 120, an audio output unit 130 for outputting audio, and the like, and also, a touch sensing apparatus integrated with the display unit 110.

As illustrated in FIG. 1, in case of the mobile device, in general, a touch sensing apparatus is integrated with the display unit, and the touch sensing apparatus is required to have sufficient light transmittance to allow an image displayed on the display unit to be transmitted therethrough. Thus, the touch sensing apparatus may be implemented by forming a sensing electrode with a material such as indium tin oxide (ITO), indium zinc oxide (IZO), zinc oxide (ZnO), carbon nanotubes (CNT), or graphene having electrical conductivity on a base substrate made of a transparent film material such as polyethylene terephthalate (PET), polycarbonate (PC), polyethersulfone (PES), polyimide (PI), or the like. A wiring pattern connected to the sensing electrode made of a transparent conductive material is disposed in a bezel region of the display unit, and since the wiring pattern is visually shielded by the bezel region, the wiring pattern may also be made of a metal such as silver (Ag), copper (Cu), or the like.

The touch sensing apparatus according to an embodiment of the present invention is assumed to operate according to a capacitive scheme, so it may include a plurality of electrodes having a predetermined pattern. Also, the touch sensing apparatus according to an embodiment of the present invention may include a capacitance sensing circuit detecting a change in capacitance generated by a plurality of electrodes, an analog-to-digital conversion circuit converting an output signal from the capacitance sensing circuit into a digital value, a calculation circuit determining a touch by using data which has been converted into the digital value, and the like. Hereinafter, the touch sensing apparatus and an operating method thereof according to an embodiment of the present invention will be described with reference to FIGS. 2 through 5.

Figure 2:
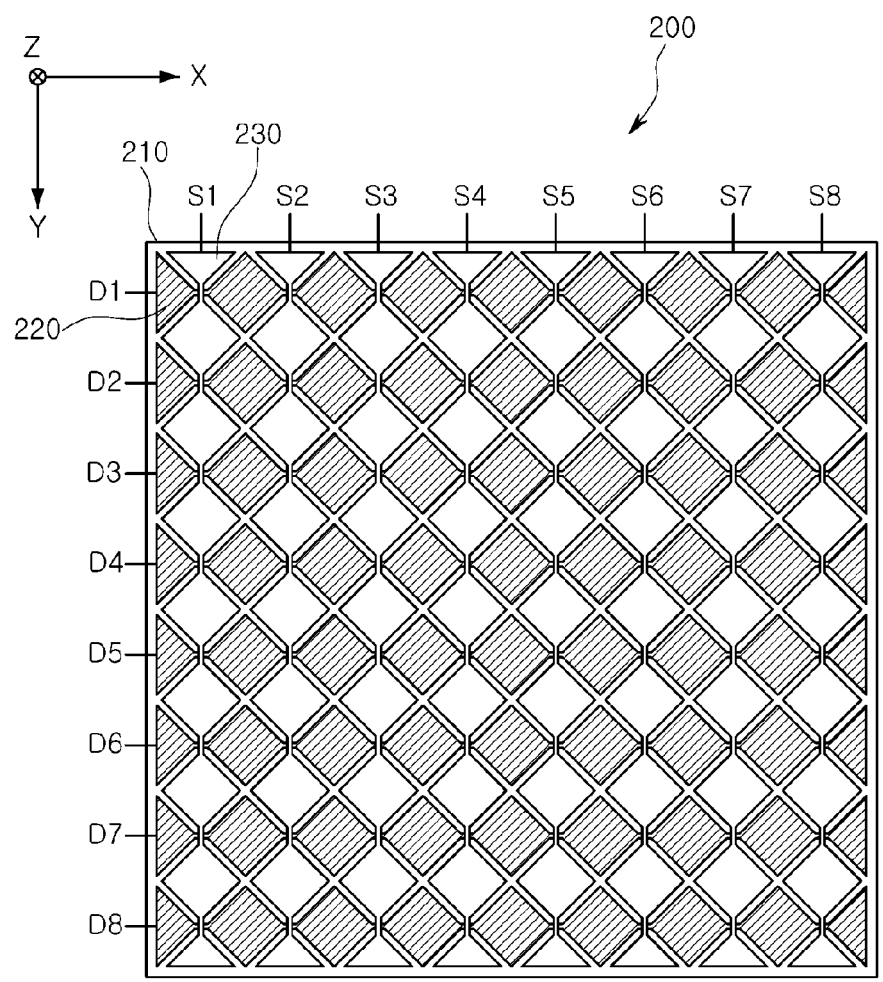
FIG. 2 is a view illustrating a panel unit that may be included in the touch sensing apparatus according to an embodiment of the present invention.

FIG. 2 is a view illustrating a panel unit that may be included in the touch sensing apparatus according to an embodiment of the present invention.

Referring to FIG. 2, a panel unit 200 according to the present embodiment includes a substrate 210 and a plurality of electrodes 220 and 230 provided on the substrate 210. Although not shown, the plurality of electrodes 220 and 230 may be electrically connected to a wiring pattern of a circuit board attached to one end of the substrate 210 through a wiring and a bonding pad, respectively. A controller integrated circuit (IC) may be mounted on the circuit board to detect sensing signals generated by the plurality of electrodes 220 and 230 and determine a touch from the sensing signals.

In the case of the touchscreen device, the substrate 210 may be a transparent substrate on which the electrodes 220 and 230 are formed, and may be made of a plastic material such as polyimide (PI), polymethylmethacrylate (PMMA), polyethyleneterephthalate (PET), polycarbonate (PC), or tempered glass. Besides a region in which the electrodes 220 and 230 are formed, a predetermined printed region for visually shielding a wiring generally made of an opaque metal may be formed on the substrate 210 with respect to a region in which the wiring connected to the electrodes 220 and 230 is provided.

The plurality of electrodes 220 and 230 may be formed on one surface of the substrate 210 or on both surfaces thereof. The touchscreen device may be made of ITO, IZO, ZnO, CNT, a graphene material, or the like, which has transparency and conductivity. In FIG. 2, the electrodes 220 and 230 having a diamond-like pattern are illustrated, but the present invention is not limited thereto and the electrodes 220 and 230 may also have various polygonal patterns such as a rectangular pattern, a triangular pattern, or the like.

The plurality of electrodes 220 and 230 include first electrodes 220 extending in an X-axial direction and second electrodes 230 extending in a Y-axial direction. The first electrodes 220 and the second electrodes 230 may be formed on both surfaces of the substrate 210 or may be alternately formed on mutually different substrates 210. In the case in which both the first electrodes 220 and the second electrodes 230 are formed on one surface of the substrate 210, a predetermined insulating layer may be partially formed in intersections between the first electrodes 220 and the second electrodes 230.

The touch sensing apparatus, electrically connected to the plurality of electrodes 220 and 230 to sense a touch, may detect a change in capacitance generated in the plurality of electrodes 220 and 230 according to a touch applied thereto, and sense the touch based on the detected change in capacitance. The first electrodes 220 may be connected to channels defined as D1 to D8 in the control IC to receive a predetermined driving signal, and the second electrode 230 may be connected to channels defined as S1 to S8 so as to be used for the touch sensing apparatus to detect a sensing signal. Here, the controller IC may detect a change in mutual capacitance generated between the first electrodes 220 and the second electrodes 230, as a sensing signal, and operate to sequentially apply a driving signal to the respective first electrodes 220 and simultaneously detect a change in capacitance in the second electrodes 230.

Figure 3:
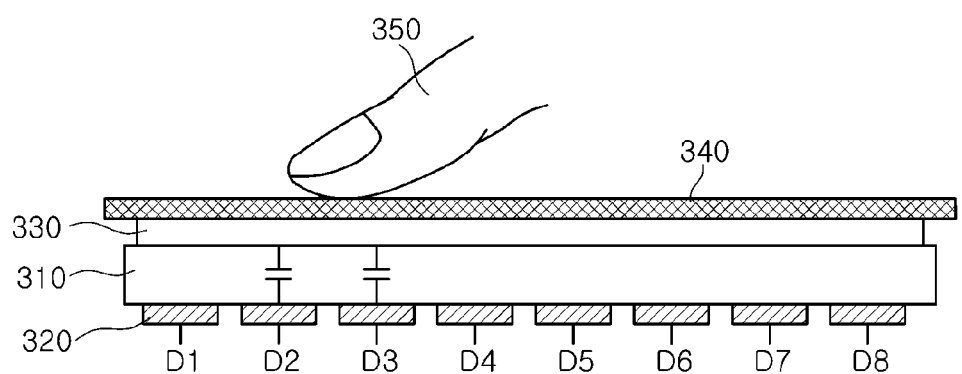
FIG. 3 is a cross-sectional view of the panel unit illustrated in FIG. 2.

FIG. 3 is a cross-sectional view of the panel unit illustrated in FIG. 2.

FIG. 3 is a cross-sectional view of the panel unit 200 illustrated in FIG. 2, taken along a plane Y-Z, which may further include a cover lens 340 receiving a contact in addition to the substrate 310 and the plurality of sensing electrodes 320 and 330 as described above with reference to FIG. 2. The cover lens 340 may be disposed on the second electrodes 330 used for detecting a sensing signal and receive a touch from a contact object 350 such as a finger, or the like.

When a driving signal is sequentially applied to the first electrodes 320 through the channels D1 to D8, mutual capacitance is generated between the first electrodes 320 to which the driving signal is applied and the second electrodes 330. When a driving signal is sequentially applied to the first electrodes 320, mutual capacitance generated between the first electrodes 320 and the second electrodes 330 adjacent to a region with which the contact object 350 came into contact is changed. The change in capacitance may be proportional to an area of an overlap region between the first electrodes 320 to which the driving signal has been applied and the second electrodes 330 and the contact object 350. In FIG. 3, mutual capacitance generated between the first electrodes 320 and the second electrodes 330 connected to the channels D2 and D3 is affected by the contact object 350.

Figure 4:
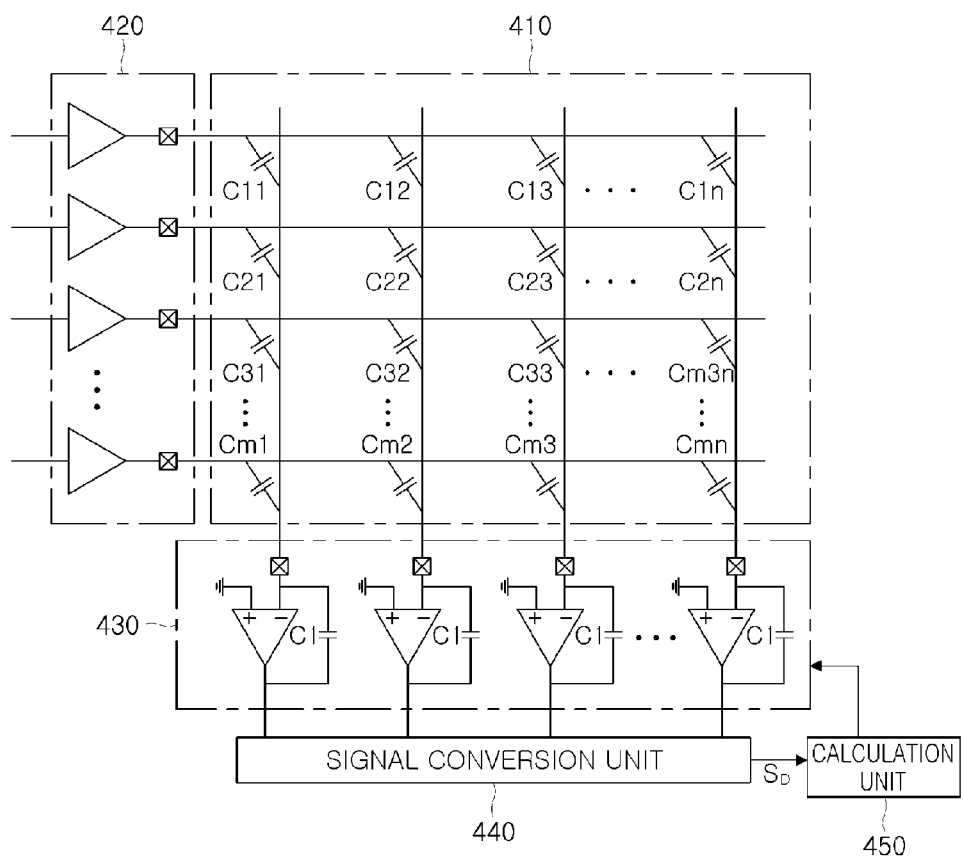
FIG. 4 is a circuit diagram of the touch sensing apparatus according to an embodiment of the present invention.

FIG. 4 is a circuit diagram of the touch sensing apparatus according to an embodiment of the present invention.

Referring to FIG. 4, the touch sensing apparatus according to an embodiment of the present invention includes a panel unit 410, a driving circuit unit 420, a sensing circuit unit 430, a signal conversion unit 440, and a calculation unit 450. In addition, the touch sensing apparatus according to the present embodiment may further include a comparison unit 460 and an LDO regulator 470. The panel unit 410 includes m number of first electrodes extending in a first axial direction (or a horizontal direction in FIG. 4) and n number of second electrodes extending in a second axial direction (or a vertical direction in FIG. 4) crossing the first axis. Capacitance changes are generated in a plurality of nodes in which the first electrodes and the second electrodes intersect. The capacitance changes generated in the plurality of nodes may be changes in mutual capacitance generated by a driving signal applied to the first electrodes by the driving circuit unit 420. C11 to Cmn may correspond to node capacitors equivalently expressing capacitance components formed by the first electrodes and the second electrodes, and electrical charges may be charged to or discharged from the node capacitors C11 to Cmn according to a change in capacitance generated in the plurality of nodes. Meanwhile, the driving circuit unit 420, the sensing circuit unit 430, the signal conversion unit 440, and the calculation unit 450 may be implemented as a single integrated circuit (IC).

The driving circuit unit 420 applies a predetermined driving signal to the first electrodes of the panel unit 410. The driving signal may have a square wave form, a sine wave form, a triangle wave form, or the like, having a predetermined period and amplitude, and may be sequentially applied to the plurality of respective first electrodes. In FIG. 4, circuits for generating and applying driving signals are individually connected to the plurality of respective first electrodes, but the present invention is not limited thereto and it may be configured such that a single driving signal generation circuit is provided and a driving signal may be applied to a plurality of respective first electrodes by using a switching circuit.

The sensing circuit unit 430 may include an integrating circuit for sensing the capacitance changes C11 to Cmn generated in the plurality of nodes. The integrating circuit may be connected to the plurality of second electrodes. The integrating circuit may include at least one operational amplifier and a capacitor C1 having a certain capacity. An inverting input terminal of the operational amplifier is connected to the second electrode to convert capacitance changes C11 to Cmn into an analog signal such as a voltage signal, or the like, and output the same. When driving signals are sequentially applied to the plurality of respective first electrodes, capacitance changes from the plurality of second electrodes may be simultaneously detected, so n number of integrating circuits corresponding to the second electrodes may be provided.

The signal conversion unit 440 generates a digital signal $S_D$ from the analog signal generated by the integrating circuit. For example, the signal conversion unit 440 may include a time-to-digital converter (TDC) circuit measuring a time during which an analog signal in a voltage form output by the sensing circuit unit 430 reaches a predetermined reference voltage level and converting the same into a digital signal $S_D$, or may include an analog-to-digital converter (ADC) circuit measuring an amount by which a level of an analog signal output by the sensing circuit unit 430 changes for a predetermined time and converting the same into a digital signal $S_D$. The calculation unit 450 may determine a touch applied to the panel unit 410 by using the digital signal $S_D$. In an embodiment of the present invention, the calculation unit 450 may determine a number of touches applied to the panel unit 410, coordinates of a touch, a touch gesture, or the like.

The digital signal $S_D$ used as a reference for the calculation unit 450 to determine a touch may be data obtained by digitizing the capacitance changes C11 to Cmn, and in particular, it may be data indicating a difference of capacitance between a case in which a touch has not been generated and a case in which a touch has been generated. In general, in a touch sensing apparatus based on a capacitance scheme, a region in which a conductive object is in contact has reduced capacitance relative to a region in which a touch has not been applied.

Figure 5:
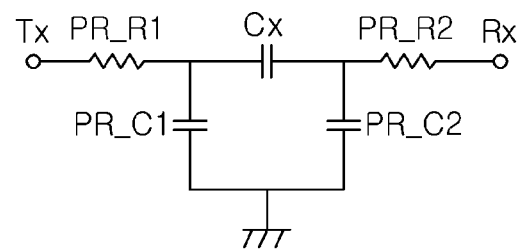
FIG. 5 is an equivalent circuit diagram of a node capacitor formed in a panel unit that may be included in the touch sensing apparatus according to an embodiment of the present invention.

FIG. 5 is an equivalent circuit diagram of a node capacitor formed in a panel unit that may be included in the touch sensing apparatus according to an embodiment of the present invention. This will be described with reference to FIGS. 4 and 5, hereinafter.

A capacitor Cx and parasitic components PR_R1, PR_R2, PR_C1, PR_C2 correspond to the node capacitors C11 to Cmn in FIG. 4, which schematically illustrates them. The driving circuit unit 420 is connected to a Tx terminal, and the sensing circuit unit 430 of FIG. 4 is connected to an Rx terminal.

The plurality of node capacitors C11 to Cmn generated in the intersections of the plurality of electrodes are equivalent to the capacitor Cx, so preferably, all the capacitances have the same value. However, due to an inevitable processing error generated during manufacturing of the panel unit 410, parasitic components PR_R1, PR_R2, PR_C1, PR_C2, besides the capacitor Cx, are formed in the panel unit 410 in nature. In general, capacitance deviations in the node capacitors C11 to Cmn due to a processing error stands at 10% to 40%.

The capacitance deviations in the node capacitors C11 to Cmn result from the parasitic components PR_R1, PR_R2, PR_C1, PR_C2 formed in serial-to-parallel manner in the capacitor Cx. The parasitic components PR_R1, PR_R2, PR_C1, PR_C2 delay a driving signal applied from the Tx terminal and lower a level of the driving signal, generating capacitance deviations in the node capacitors C11 to Cmn. Namely, even in case of using a sensing circuit having the same performance, if there is an influence of the parasitic components PR_R1, PR_R2, PR_C1, PR_C2, it is impossible to accurately determine a touch.

An operation of the touch sensing apparatus according to an embodiment of the present invention will be described with reference to FIGS. 4 and 5.

Besides a driving signal, the driving circuit unit 420 applies a scanning signal having a frequency lower than that of the driving signal to m number of first electrodes and the sensing circuit unit 430 detects a change in capacitance from second electrodes intersecting the first electrodes to which the scanning signal has been applied. The calculation unit 450 measures capacitance deviations in the plurality of node capacitors C11 to Cmn by using m×n number of digital data generated by a change in capacitance. Here, the scanning signal may be applied to the panel unit 410 without a touch being applied to the panel unit 410.

Since the scanning signal having a frequency lower than that of the driving signal is applied to the plurality of first electrodes, an influence by the parasitic components PR_R1, PR_R2, PR_C1, PR_C2 can be minimized, and thus capacitance of each of the plurality of node capacitors C11 to Cmn can be accurately measured. For example, a frequency of the scanning signal may correspond to ½ or ¼ of that of the operating signal.

The calculation unit 450 may calculate capacitance deviations from the measured capacitances of the measured node capacitors C11 to Cmn, and generates compensation data for obtaining the same change of capacitance in spite of the deviations of capacitance. The calculation unit 450 may include a memory for storing the compensation data, and controls a gain of the sensing circuit unit 430 according to the compensation data stored in the memory. In detail, capacitance of at least one capacitor C1 provided in the sensing circuit unit 430 may be adjusted.

Namely, in detecting a change in capacitance generated by the plurality of node capacitors C11 to Cmn, the calculation unit 450 adjusts at least one capacitor C1 of the sensing circuit unit 430 according to the compensation data corresponding to the plurality of node capacitors C11 to Cmn, to thereby making a difference in output values of the sensing circuit unit 430 of the respective node capacitors C11 to Cmn, i.e., a change in capacitance, uniform in the event of touch and non-touch.

Figure 6A:
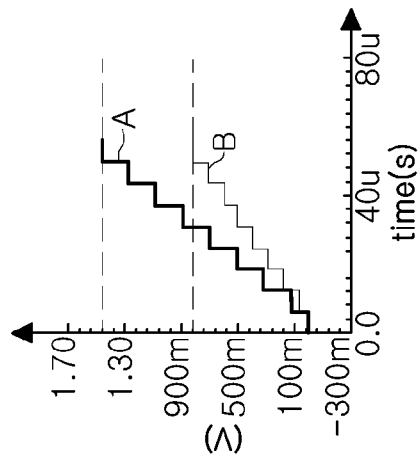
FIGS. 6A-6C are graphs showing simulation data of the touch sensing apparatus according to an embodiment of the present invention.
Figure 6B:
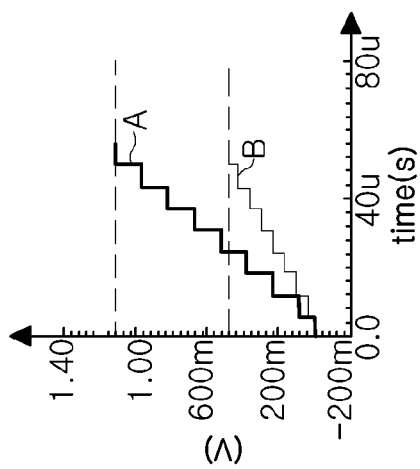
Figure 6C:
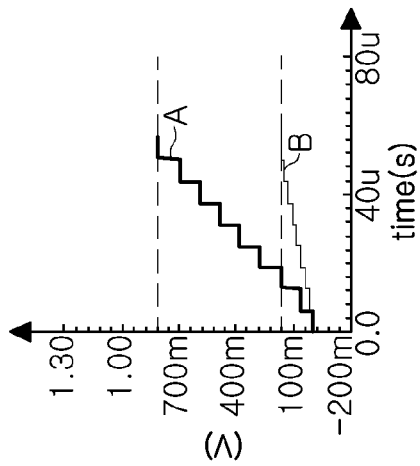

FIG. 6 is a graph showing simulation data of the touch sensing apparatus according to an embodiment of the present invention. The graph of FIG. 6 is a graph of output voltages of the sensing circuit unit in FIG. 4 over time, in which A is generated in the event of non-touch and B is generated in the event of touch.

Capacitance of the node capacitor of FIG. 6(*a*) is 3.3 pF, capacitance of the node capacitor of FIG. 6(*b*) is 3.3 pF, and capacitance of the node capacitor of FIG. 6(*c*) is 2.7 pF, which are set to be different in consideration of an influence that may be generated by parasitic components.

Referring to FIGS. 6(*a*), 6(*b*), and 6(*c*), it can be seen that the levels of the output voltages are different due to the difference in capacitance between the respective node capacitors, but differences between voltages levels of A and B at 63 us were 628.238 mV, 627.812 mV, and 627.924 mV, respectively, indicating that changes in capacitance of the respective node capacitors are relatively uniformly maintained.

As set forth above, according to embodiments of the invention, in a state in which a touch panel is not touched, capacitance deviations in node capacitors formed in the touch panel are calculated by applying a scanning signal having a frequency lower than that of a driving signal, and the calculated capacitance deviations are compensated for to allow changes in capacitance of the respective node capacitors are maintained uniformly, and thus, a touch can be discriminated or identified without an error.

While the present invention has been shown and described in connection with the embodiments, it will be apparent to those skilled in the art that modifications and variations can be made without departing from the spirit and scope of the invention as defined by the appended claims.

What is claimed is:

1. A touch sensing apparatus comprising:
a panel unit including a plurality of driving electrodes and a plurality of sensing electrodes;
a driving circuit unit applying, at different times, a driving signal and a scanning signal having a frequency different from that of the driving signal to each of the plurality of driving electrodes;
a sensing circuit unit measuring a change in capacitance of a plurality of node capacitors in intersections of the plurality of driving electrodes and the plurality of sensing electrodes; and
a calculation unit determining a touch based on the change in the capacitance,
the calculation unit calculating compensation data based on capacitance deviations generated in the plurality of node capacitors by the scanning signal having a different frequency than the driving signal,
wherein the scanning signal has a frequency lower than that of the driving signal.

2. The touch sensing apparatus of claim 1, wherein the scanning signal is applied in a state in which the panel unit is not touched.

3. The touch sensing apparatus of claim 1, wherein when the driving signal is applied to the plurality of driving electrodes, the calculation unit uses the compensation data to compensate for the capacitance deviations in the plurality of node capacitors such that changes in capacitance generated by the plurality of node capacitors are uniform.

4. The touch sensing apparatus of claim 3, wherein the calculation unit controls a gain of the sensing circuit unit according to the compensation data.

5. The touch sensing apparatus of claim 1, wherein the sensing circuit unit comprises at least one capacitor to measure a change in capacitance, and the calculation unit adjusts capacitance of the at least one capacitor according to the compensation data.

6. The touch sensing apparatus of claim 1, wherein the calculation unit determines at least one of the amount of touch inputs, coordinates of touch inputs, and a touch gesture based on the change in the capacitance.

7. The touch sensing apparatus of claim 1, wherein the calculation unit calculates the compensation data to compensate for parasitic components in the plurality of node capacitors.

8. A touch sensing apparatus comprising:
a panel unit including a plurality of first electrodes extending in a first axial direction and a plurality of second electrodes extending in a second axial direction crossing the first axial direction; and
a controller determining a touch by detecting a change in capacitance of a plurality of node capacitors formed between the plurality of first electrodes and the plurality of second electrodes,
when a scanning signal having a different frequency than a driving signal is applied to the plurality of first electrodes, the controller calculates compensation data based on capacitance deviations generated in the plurality of node capacitors by the scanning signal having a different frequency than the driving signal, wherein the scanning signal has a frequency lower than that of the driving signal.

9. The touch sensing apparatus of claim 8, wherein the scanning signal is applied in a state in which the panel unit is not touched.

10. The touch sensing apparatus of claim 8, wherein when the driving signal having a frequency higher than that of the scanning signal is applied to the first electrodes, the controller uses the compensation data to compensate for capacitance deviations in the plurality of capacitors such that changes in capacitance generated by the plurality of node capacitors are uniform.

11. The touch sensing apparatus of claim 10, wherein the controller adjusts capacitance of at least one capacitor provided to detect a change in capacitance according to the compensation data.

12. The touch sensing apparatus of claim 8, wherein the calculation unit determines at least one of the amount of touch inputs, coordinates of touch inputs, and a touch gesture by detecting a change in capacitance.

13. A touch sensing apparatus comprising:

a panel unit including a plurality of driving electrodes and a plurality of sensing electrodes;

a driving circuit unit applying, at different times, a driving signal and a scanning signal having a frequency different from that of the driving signal to each of the plurality of driving electrodes;

a sensing circuit unit measuring a change in capacitance of a plurality of node capacitors in intersections of the plurality of driving electrodes and the plurality of sensing electrodes; and a calculation unit determining a touch based on the change in the capacitance, the calculation unit calculating compensation data based on capacitance deviations generated in the plurality of node capacitors by the scanning signal having a different frequency than the driving signal, and the sensing circuit unit comprising at least one capacitor to measure a change in capacitance, and the calculation unit adjusts capacitance of the at least one capacitor according to the compensation data.

14. A touch sensing apparatus comprising:

a panel unit including a plurality of first electrodes extending in a first axial direction and a plurality of second electrodes extending in a second axial direction crossing the first axial direction; and a controller determining a touch by detecting a change in capacitance of a plurality of node capacitors formed between the plurality of first electrodes and the plurality of second electrodes, when a scanning signal having a different frequency than a driving signal is applied to the plurality of first electrodes, the controller calculates compensation data based on capacitance deviations generated in the plurality of node capacitors by the scanning signal having a different frequency than the driving signal, and when the driving signal having a frequency higher than that of the scanning signal is applied to the first electrodes, the controller uses the compensation data to compensate for capacitance deviations in the plurality of capacitors such that changes in capacitance generated by the plurality of node capacitors are uniform.

* * * * *